E. W. HOWE.
GRIDDLE.
APPLICATION FILED SEPT. 16, 1919.
1,342,444.
Patented June 8, 1920.
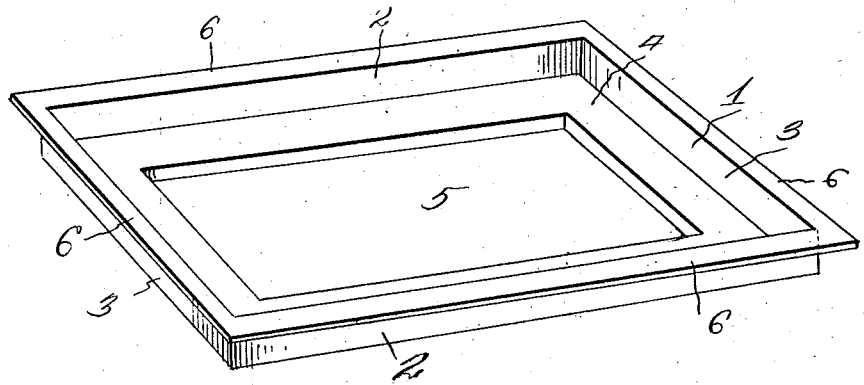
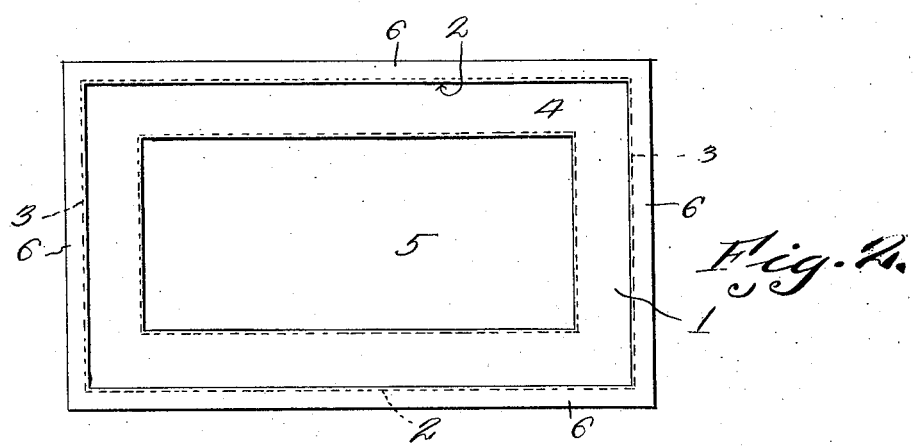
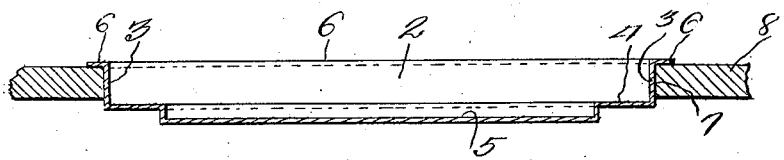
Inventor
Earl W. Howe
By D. Swift
Attorney

UNITED STATES PATENT OFFICE.

EARL W. HOWE, OF NORFOLK, VIRGINIA.

GRIDDLE.

1,342,444.　　　　　Specification of Letters Patent.　　Patented June 8, 1920.

Application filed September 16, 1919. Serial No. 324,088.

*To all whom it may concern:*

Be it known that I, EARL W. HOWE, a citizen of the United States, residing at Norfolk, in the county of Norfolk, State of Virginia, have invented a new and useful Griddle; and I do hereby declare the following to be a full, clear, and exact description of the invention, such as will enable others skilled in the art to which it appertains to make and use the same.

The invention relates to griddles and has for its object to provide a griddle particularly adapted for use on fair grounds and other public places where food stuffs, such for instance as hamburger steak is cooked and sold to the public. Also to provide a griddle of this character having a marginal flange adapted to engage the marginal edge in an opening of a counter or the like, said flange forming means for supporting the griddle as a whole.

A further object is to provide a griddle comprising a centrally disposed cooking depression in which hamburger steak or the like may be fried and a ledge in a horizontal plane around the cooking depression, on which ledge batches of hamburger steak may be thrown so as to flatten its under side and if so desired its upper side flattened by a cooking tool, such for instance as a cake turner, thereby preventing the splashing of grease on the persons adjacent the griddle. The ledge also forming means on which the articles as they are cooked may be disposed for drainage and for display as well as a place for maintaining the cooked article so that they will remain heated.

A further object is to provide a griddle comprising a frying depression, a ledge surrounding said frying depression and a marginal supporting flange, whereby the griddle as a whole may be supported within an opening of the counter or the like, the ledge forming a supporting and draining place on which the articles are deposited after being fried so that the grease from said articles will drain into the frying depression.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a perspective view of the griddle.

Fig. 2 is a top plan view of the griddle.

Fig. 3 is a longitudinal sectional view showing the griddle supported within an opening of a counter or the like.

Referring to the drawings, the numeral 1 designates a griddle which is stamped from a single sheet of sheet metal, or if so desired the same may be cast in one piece. The griddle 1 comprises side and end walls 2 and 3 which walls are preferably vertical so as to prevent the splashing of grease as the uncooked material is thrown on the ledge 4. In actual practice the walls 2 and 3 are preferably from three to four inches in height, however these walls may be of any depth desired. Ledge 4 is preferably in a horizontal plane and if so desired may incline inwardly.

A centrally disposed frying depression 5 is provided in which the batches of hamburger or the like is fried and in which depression 5 the grease in which the article that is being fried is deposited. Any grease that may collect on the ledge 4 will drain into the depression 5 thereby preventing the collection of the grease on the ledge 4 and also preventing, when batches of material before being cooked are thrown onto the ledge, the splashing of grease on the operator or those who may be adjacent the griddle and counter.

The operation is as follows: The operator deposits the material to be cooked on one of the sides of the ledge 4, which depositing operation will flatten the under side thereof after which he may if he so desires smooth off the top of the same. The depression 5 having grease therein, therefore when it is desired to fry the hamburger or any other article the operator removes the uncooked material from the ledge and deposits the same in the frying depression 5. After the articles have been fried they are removed from the depression in the griddle and deposited on the ledge for drainage and display purposes, also for maintaining the articles heated. The articles having been deposited in a cooked condition on the ledge it will be seen that the grease as it drains from the articles will flow back into the frying depression 5. The ledge will be sufficiently heated to maintain the articles on display thereon hot so that they can be served as desired.

From the above it will be seen that a griddle is provided which is particularly adapted for use on fair grounds and other public places where articles of food are cooked and sold to the public. However it is to be understood that the griddle may be used by placing the same on a stove in hotels, boarding houses and other places particularly in places where articles are fried in quantities, maintained heated and served. It will also be seen that a griddle is provided wherein the articles cooked will thoroughly drain and the grease that drains from the same will flow back into the frying depression. A griddle of this character and design may be easily, quickly and cheaply stamped from a single piece of sheet metal or if so desired cast in one piece.

The griddle as a whole is supported by means of its substantially horizontal flanges 6 within an opening 7 of a counter or the like 8 thereby providing means for supporting the griddle so that its upper face will be substantially flush with the counter.

The invention having been set forth what is claimed as new and useful is:—

A griddle comprising a frying depression having upstanding vertical walls around its marginal edge, said upstanding walls having a substantially horizontal ledge on which cooked articles may be deposited for drainage, the outer edge of the ledge being provided with substantially vertical walls for preventing the splashing of grease as articles of food are deposited on the ledge and a flange carried by the last named vertical walls whereby the griddle as a whole may be supported in an opening over the fire.

In testimony whereof I have signed my name to this specification.

EARL W. HOWE.